United States Patent Office 3,414,613
Patented Dec. 3, 1968

3,414,613
BIS(TRIPHENYLHALOPHOSPHINIMINIUM)
THIONYL HALIDES
Rolf Appel, Bonn, Germany, assignor to Olin Mathieson
Chemical Corporation, a corporation of Virginia
No Drawing. Filed Dec. 13, 1963, Ser. No. 330,249
5 Claims. (Cl. 260—551)

ABSTRACT OF THE DISCLOSURE

Novel bis(triphenylhalophosphiniminium) thionyl halides having the formula:

$$[(A_3P:N.X)_2SO]X_2$$

in which A is phenyl and X is chlorine or bromine are prepared by the reaction of N-halotriphenylphosphinimine with either thionyl chloride or thionyl bromide. The products contain available chlorine or bromine and are useful as bleaching and sterilizing agents.

---

This invention relates to novel bis(triphenylhalophospiniminium) thionyl halides having the formula $$[(A_3P:N.X)_2SO]X_2$$

in which A is phenyl and X is chlorine or bromine and to the novel process of preparing them.

The novel compounds are stable solids containing available halogen and are useful as bleaching and sterilizing agents.

The process of the invention is an additive chemical reaction and is carried out by combining the reactants in substantially stoichiometric proportions in an inert reaction medium. The reactants are combined in the proportions of 2 moles of N-halo-triphenylphosphinimine to 1 mole of thionyl halide. An excess of either reactant may be used but does not appear necessary. Suitable reactants are N-bromo-triphenylphosphinimine and either thionyl chloride or bromide. Exemplary products are:

Bis(triphenylchlorophosphiniminium)thionyl chloride
Bis(triphenylchlorophosphiniminium) thionyl bromide
Bis(triphenylbromophosphiniminium)thionyl chloride
Bis(triphenylbromophosphiniminium)thionyl bromide Benzene is preferred as inert reaction medium but petoleum ether, ligroin, xylenes, chlorobenzenes and the highly chlorinated lower aliphatic hydrocarbons for example, carbon tetrachloride and tetrachloroethane are suitable. The reactants are generally sufficiently soluble in these solvents and the products of this invention are less soluble. They precipitate and are filtered, washed and dried and/or crystallized for purification.

The process of this invention occurs readily at ambient temperatures and can be carried out from room temperature to 50° C. or more.

EXAMPLE I

To a solution of 3.26 g. (0.00915 mole) of N-bromotriphenylphosphinimine in 100 ml. of anhydrous benzene was added dropwise during one-half hour 1.09 g. (0.00915 mole) of thionyl chloride. A yellow oil separated which soon crystallized. It was filtered off and weighed 3.75 g. The residual solution contained unreacted thionyl chloride but no bromo-imine. The yield was 90% of theory for reaction of the bromo-imine and thionyl chloride in molar proportions of 2:1 respectively. The bis(triphenylbromophosphiniminium) thionyl chloride was dissolved in chloroform and then carbon tetrachloride was added until cloudy. After standing for 24 hours, the yellow needles which formed were filtered, dried in a desiccator and then melted sharply at 160° C.

Analysis.—$C_{36}H_{30}N_2P_2OSCl_2Br_2$ (831), Calc.: C. 52.00; H, 3.70; N, 3.32; P, 7.45; S, 3.85; Cl, 8.52. Found: C, 51.04; H, 4.17; N, 3.29; P, 7.57; S, 3.67; Cl, 8.33.

Oxidation equivalent, by thiosulfate titration, 0.51 compared with 0.50 theoretically.

EXAMPLE II

Addition of thionyl chloride to a benzene solution of N-chlorotriphenylphosphinimine in molar proportions of 0.5 mole of thionyl chloride to 1 mole of N-chlorotriphenylphosphinimine produces the same compound as in Example I.

What is claimed is:
1. A bis(triphenylhalophosphiniminium)thionyl halide having the formula

$$[(A_3P:N.X)_2SO]X_2$$

in which A is phenyl and X is selected from the group consisting of chlorine and bromine.

2. Method of preparing a bis(triphenylhalophosphiniminium)thionyl halide by reacting an N-halotriphenylphosphinimine with thionyl halide in an inert reaction medium at ambient temperature to form a reaction mixture containing a bis(triphenylhalophosphiniminium)thionyl halide and separating said bis(triphenylhalophosphiniminium)thionyl halide from said inert reaction medium, each of said halo and said halide being independently selected from the group consisting of chlorine and bromine.

3. Method of claim 2 in which said inert reaction medium is benzene.

4. Method of claim 2 in which the molar proportion of said N-halotriphenylphosphinimine to said thionyl halide is substantially 2:1.

5. Method of claim 2 in which said N-halotriphenylphosphinimine is N-chlorotriphenylphosphinimine and said thionyl halide is thonyl chlorde.

References Cited

Appel et al.: Z. Anargansche and Allgmine Chem., vol. 320, January, 1963, pp. 7, 9 and 10.

JOHN D. RANDOLPH, Primary Examiner.

H. I. MOATZ, Assistant Examiner.